(No Model.) 2 Sheets—Sheet 1.
A. S. COOPER.
APPARATUS FOR MANUFACTURING GAS.
No. 582,044. Patented May 4, 1897.
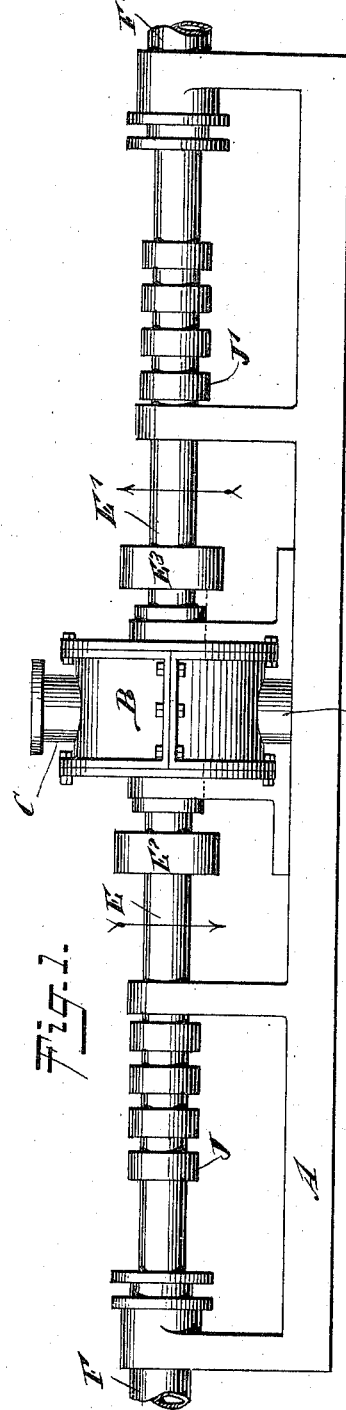
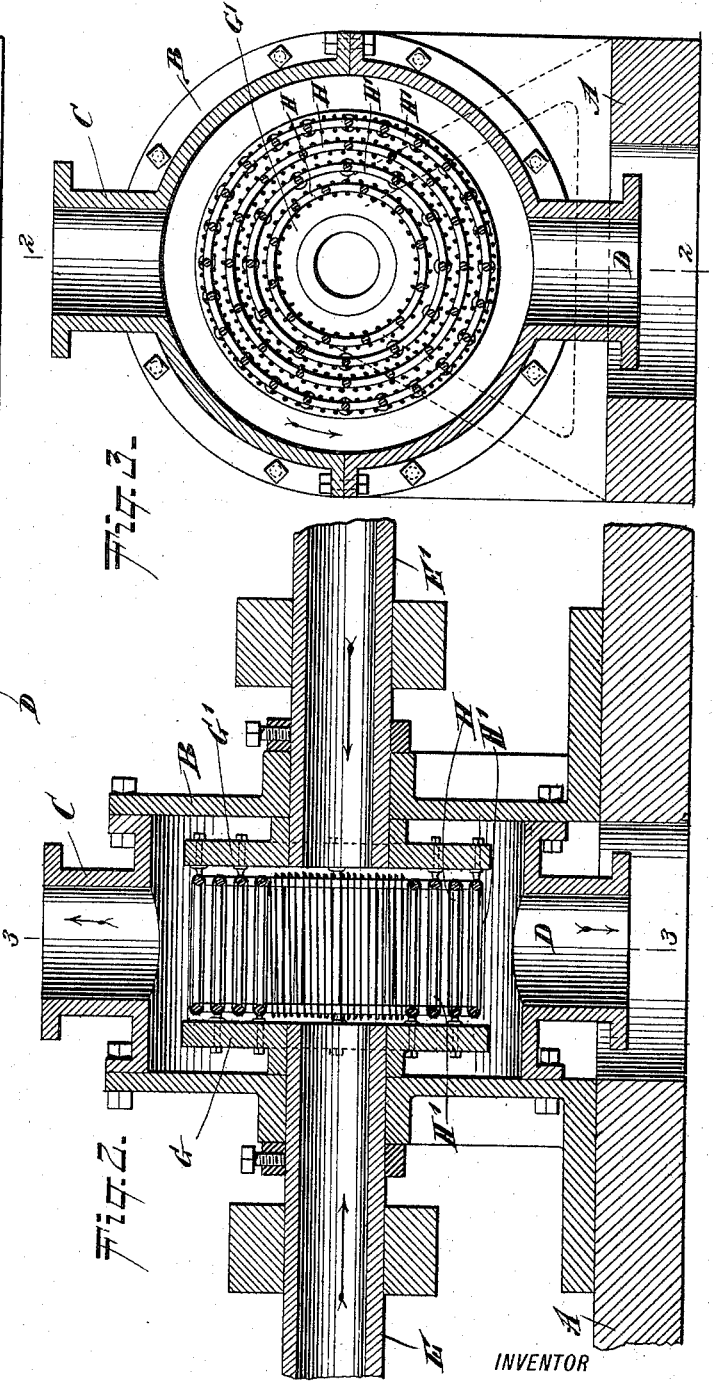
WITNESSES:
INVENTOR
A. S. Cooper
BY
ATTORNEYS.

(No Model.)
2 Sheets—Sheet 2.
A. S. COOPER.
APPARATUS FOR MANUFACTURING GAS.
No. 582,044. Patented May 4, 1897.
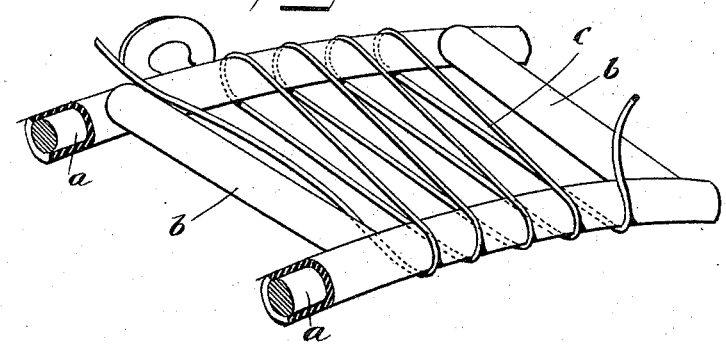
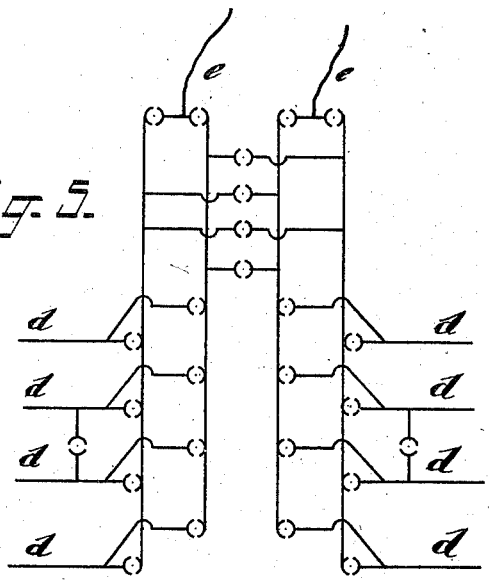
WITNESSES:
William P. Goebel.
Theo. G. Hoster
INVENTOR
A. S. Cooper
BY
ATTORNEYS.

UNITED STATES PATENT OFFICE.

AUGUSTUS STEIGER COOPER, OF SANTA BARBARA, CALIFORNIA.

APPARATUS FOR MANUFACTURING GAS.

SPECIFICATION forming part of Letters Patent No. 582,044, dated May 4, 1897.

Application filed May 4, 1896. Serial No. 590,157. (No model.)

*To all whom it may concern:*

Be it known that I, AUGUSTUS STEIGER COOPER, of Santa Barbara, in the county of Santa Barbara and State of California, have invented a certain new and useful Improvement in Apparatus for Manufacturing Gas, of which the following is a full, clear, and exact description.

The object of the invention is to provide certain new and useful improvements in means for manufacturing illuminating and other gas from crude petroleum, whereby the gas is fixed in a very short time and the tar and other liquid hydrocarbons resulting from the decomposition of vapors are readily separated from the gas and discharged separately from the same.

The invention consists principally in a method whereby the hydrocarbon vapors are subjected to the action of revolving and electrically-heated wires for rapidly decomposing the said vapors.

The invention consists in an apparatus hereinafter more fully described, and defined in the claims.

Reference is to be had to the accompanying drawings, forming a part of this specification, in which similar characters of reference indicate corresponding parts in all the figures.

Figure 1 is a side elevation of the apparatus. Fig. 2 is an enlarged sectional side elevation of the casing and parts contained therein, the section being taken on the line 2 2 of Fig. 3. Fig. 3 is a transverse section of the same on the line 3 3 of Fig. 2. Fig. 4 is a fragmentary view of one of the electrical cages in the casing, and Fig. 5 illustrates diagrammatically electrical wiring for the apparatus.

Crude petroleum, as is well known, is a natural mechanical mixture of an indefinite number of differently-combined hydrocarbons which are held mutually in solution one by the other and which vary in specific gravity from an attenuated and indissoluble gas to a solid substance.

In order to form a permanent illuminating-gas or other petroleum products from heavy petroleum-oils, it is necessary that the liquid hydrocarbon be first vaporized, and then the vapors are brought in contact with solid bodies heated to a temperature higher than the boiling-point of the hydrocarbon which has been vaporized. The vapors are thus cracked or decomposed, forming illuminating-gas and other educts of petroleum. My invention relates to this process and will now be described.

On a suitably-constructed base A is secured a casing B, preferably made cylindrical and formed at its top with an outlet C for carrying off the fixed gas or decomposed vapors, the casing being provided at its bottom with an outlet D for the discharge of the educts of the vapors from the heavy liquid hydrocarbon referred to before. The hydrocarbon vapors are passed into the interior of the casing B by pipes E E', mounted to rotate in opposite directions and carrying for this purpose pulleys $E^2 E^3$, respectively connected by belts with suitable machinery for imparting the desired motion to the said pipes. The outer ends of the pipes are connected with fixed pipes F F', connected with a still or other device in which the hydrocarbon vapors are generated. The inner ends of the pipes E E' carry disks G G', respectively supporting alternate concentric wire-wound cages H H'. The said cages revolve in opposite directions by corresponding motion given to the shafts E E'. The wires of the cages H H' are connected with suitable contact-bands I I', held on the shafts E E', respectively, said contact-wires being engaged by brushes of a dynamo or other electricity-generating machine, so that electricity can pass to said wire cages and heat the wires thereof to the desired degree.

The cages H and H' are duplicates of each other and, as may be best seen in Fig. 4, consist each in two hoops $a$, held together by bars $b$. The hoops $a$ and bars $b$ are insulated, as shown, and the wires $c$ are wound in connected loops over the hoops and parallel with the bars. Each cage has a single wire $c$, the terminals of which are respectively connected to two of the bands or collars I and I', according to the disk G or G' to which the respective cages are fixed. Fig. 5 is a diagram of the electrical connections whereby the wires $c$ are fed and whereby their action may be regulated. In this diagram the lines $d$ represent leaders to the collars I and I', while the line $e$ represents wires connected to a suitable electrical generator. By means of the indicated arrangement of the circuits and switches or by any other arrangement that may be preferred the cages H and H' may be operated in unison or individually, according to the requirement of the work being performed. It is also evident that the intensity of the current which passes through the wires c may be regulated by rheostats employed as in practice.

Now when the machine is in operation the vapors passing into the casing B come in contact with the electrically-heated wires of the wire cages turning in opposite directions, so that the vapors are readily decomposed to form permanent gases or decomposed vapors, which pass through the outlet-pipe C to the washer or gas holder or condenser, while the other educts of the hydrocarbons pass into the bottom of the casing B and flow by their own gravity through the outlet-pipe D to a suitable receptacle.

It is understood that the hydrocarbon vapors passing into the casing B first come in contact with the highly-heated wire of the innermost cage rotating in one direction, so that the vapors are thrown by the force of a turning cage to the highly-heated wire of the next cage rotating in an opposite direction, and from this cage the vapors again pass by the same force to the wire of the next concentric cage, and so on through all the several cages, until the vapors are completely decomposed and their educts pass from the casing B.

It is understood that the operation of decomposing the vapors lasts at the most but a small fraction of a second, the time depending on the sizes of the cages and the velocity of their rotation. By having the cages revolve at a very great speed I bring the heated wires in contact with a large amount of the hydrocarbon vapors, and consequently a rapid decomposition of the vapors is obtained, especially as the molecules of the vapors have to pass in a zigzag line through the several cages before discharging.

The wire to be heated electrically is preferably German silver, but other suitable metal may be employed.

Should the wire be decomposed or injured by coming in contact with the hot petroleum vapors, it can be electroplated with some other metal or alloy or coated with a refractory substance that will resist the decomposing action.

Having thus fully described my invention, I claim as new and desire to secure by Letters Patent—

1. An apparatus of the class described, comprising a casing, and a series of revoluble and electrically-heated wire cages arranged to rotate in said casing, substantially as shown and described.

2. An apparatus of the class described, comprising a casing connected with a vapor-supply and having an upper and lower outlet, and revoluble wire cages within said casing and connected with a source of electricity, for heating the wires of the cages, substantially as shown and described.

3. An apparatus of the class described, comprising a casing connected with a hydrocarbon-vapor supply, and concentric wire cages mounted to revolve in opposite directions within said casing, the wires of said cages being connected with a source of electricity for heating the same, substantially as shown and described.

4. An apparatus of the class described, comprising a casing connected with a hydrocarbon-vapor supply, and concentric wire cages mounted to revolve in opposite directions within said casing, the wires of said cages being connected with a source of electricity for heating the wires, as set forth.

5. An apparatus for decomposing hydrocarbon vapors, the apparatus having a receptacle for the vapors, and an electrically-heated solid within the receptacle and with which the vapors contact the solid being movable within the receptacle to accelerate the decomposition, substantially as described.

6. An apparatus for decomposing hydrocarbon vapors, the apparatus having a receptacle with an upper and lower outlet, and a solid within the receptacle and with which the vapors contact, the solid being movable through the vapors to accelerate the decomposition thereof, substantially as described.

AUGUSTUS STEIGER COOPER.

Witnesses:
JOHN KENNEDY HARRINGTON,
JOSE RAMON MALO.